United States Patent
Hudgins

(12) 
(10) Patent No.: US 6,415,873 B1
(45) Date of Patent: Jul. 9, 2002

(54) SAND FIGHTER

(76) Inventor: Jimmy Hudgins, 1817 FM 1606, Hermleigh, TX (US) 79526

( * ) Notice: Subject to any disclaimer, the term of this patent is extended or adjusted under 35 U.S.C. 154(b) by 0 days.

(21) Appl. No.: 09/691,929

(22) Filed: Oct. 19, 2000

(51) Int. Cl.[7] .............................................. A01B 73/06
(52) U.S. Cl. ...................................................... 172/311
(58) Field of Search ................................. 172/310, 311, 172/21, 22, 456, 452, 540, 554, 548, 553, 460, 549–551

(56) References Cited

U.S. PATENT DOCUMENTS

| | | | |
|---|---|---|---|
| 1,535,058 A | 4/1925 | Taylor | |
| 3,401,752 A | 9/1968 | Nja | 172/452 |
| 4,031,965 A | 6/1977 | Blair | 172/311 |
| 4,171,726 A | 10/1979 | Ward | 172/456 |
| 4,383,580 A | 5/1983 | Huxford | 172/21 |
| 4,612,997 A | 9/1986 | Wilkins | 172/776 |
| 4,619,330 A | 10/1986 | Machnee | 172/311 |
| 4,867,245 A * | 9/1989 | Stevens | 172/311 |
| 5,062,489 A | 11/1991 | Adee | 172/311 |
| 5,178,328 A * | 1/1993 | Broyhill | 172/311 |
| 5,839,516 A | 11/1998 | Arnold et al. | 172/456 |
| 5,934,382 A | 8/1999 | Wilkins | 172/460 |
| 6,035,942 A * | 3/2000 | Smith et al. | 172/311 |
| 6,076,613 A * | 6/2000 | Fraiser | 172/311 |
| 6,220,366 B1 * | 4/2001 | Noonan et al. | 172/311 |

* cited by examiner

*Primary Examiner*—Robert E. Pezzuto
(74) *Attorney, Agent, or Firm*—Browning Bushman P.C.

(57) ABSTRACT

A sand fighter with a lightweight, articulated frame is provided. The frame of the sand fighter comprises five frame sections with the center frame substantially shorter in length than the other sections of the frame. Each section includes a shaft with a plurality of evenly spaced tines to till up the heavier moist soil below the surface. The center section includes a hitch adapted to be attached to only two points of a standard three point hitch of the farm tractor. The center section is hydraulically actuated to lift the entire sand fighter up out of the soil. The two sections immediately outboard of the center section, i.e. the intermediate sections, are preferably joined to the center section with hydraulically actuated, hinged joints so that these sections are drawn forward alongside the towing frame for transport of the sand fighter. The outermost sections are preferably manually operated, although these sections may also be hydraulically actuated. The outermost sections collapse alongside the intermediate sections to provide a small profile for transport of the sand fighter.

8 Claims, 3 Drawing Sheets

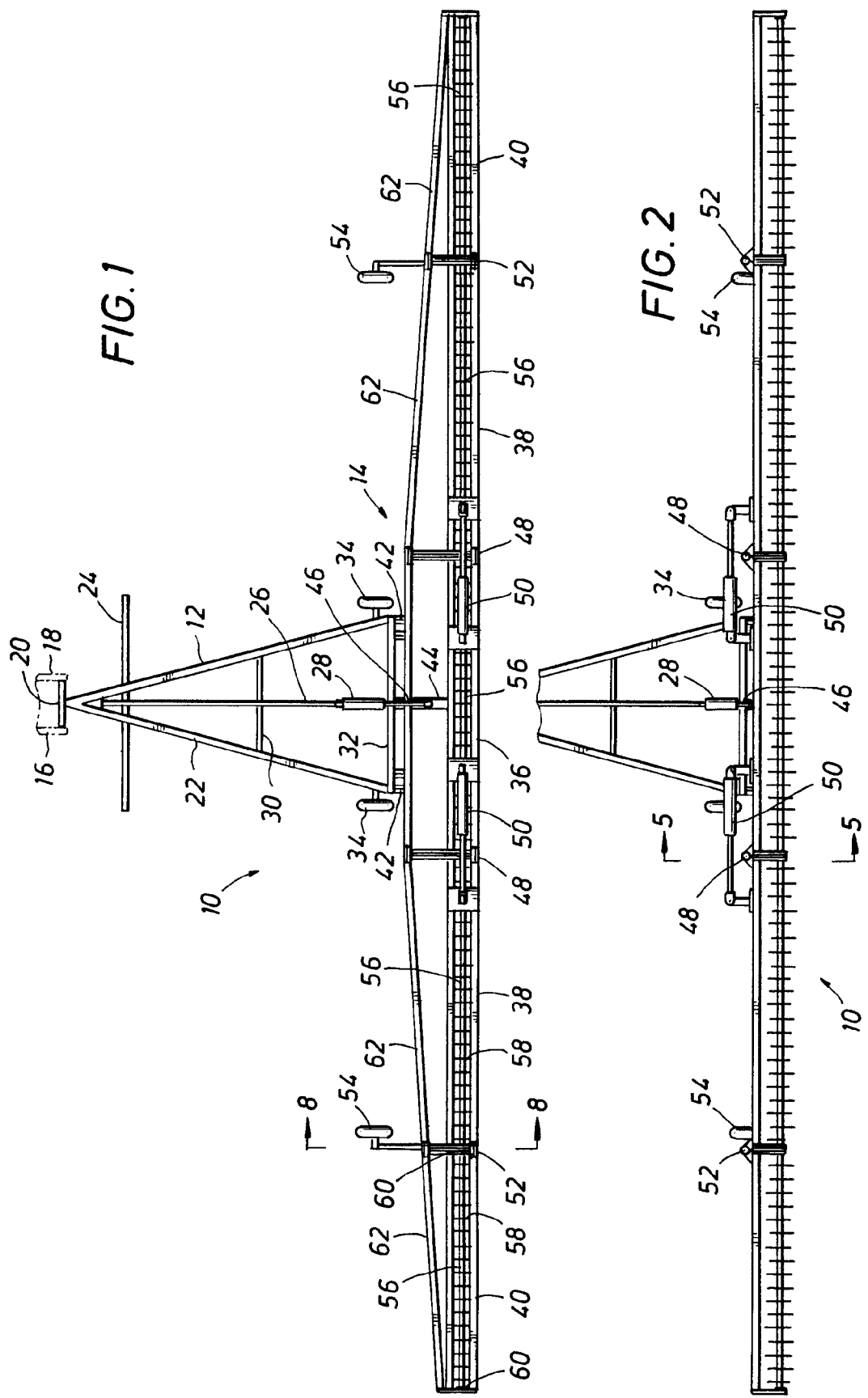

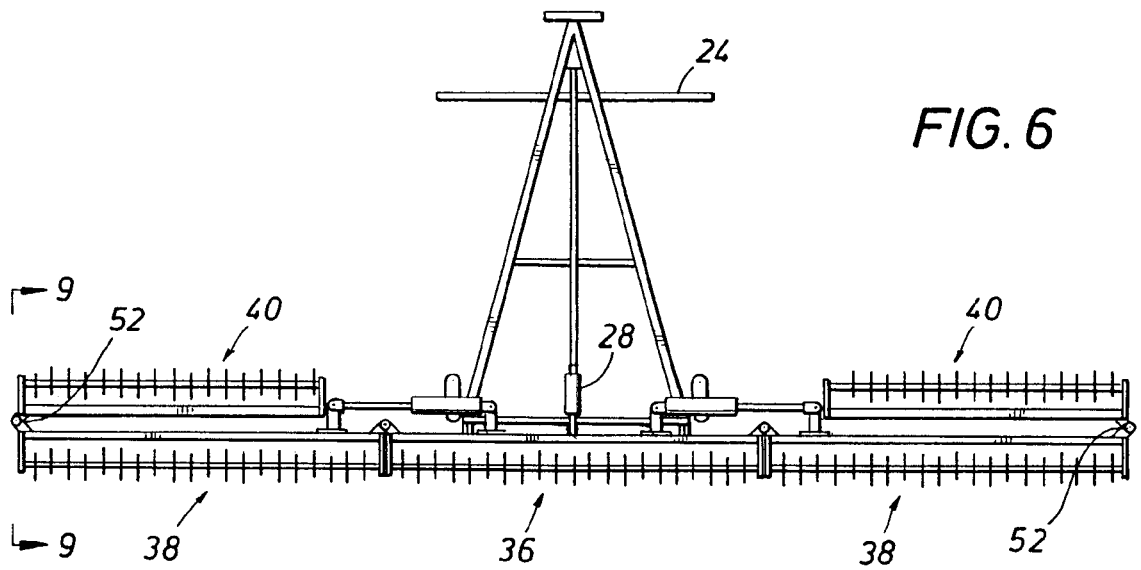
FIG. 6
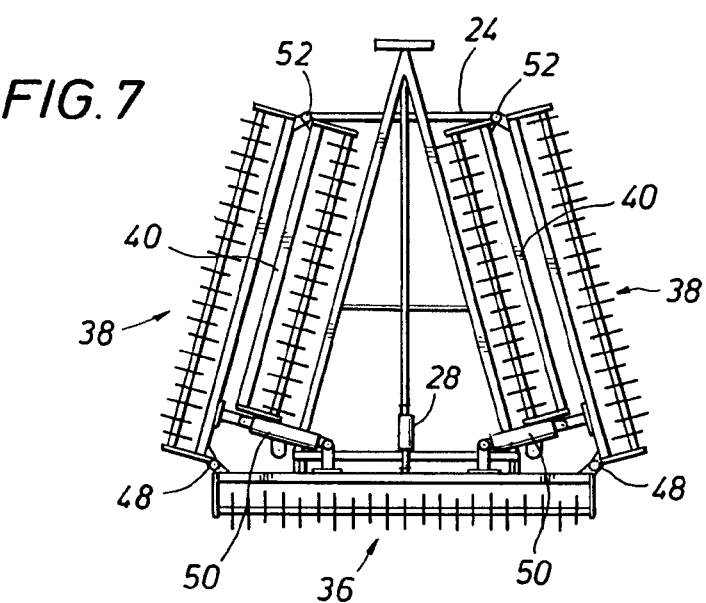
FIG. 7
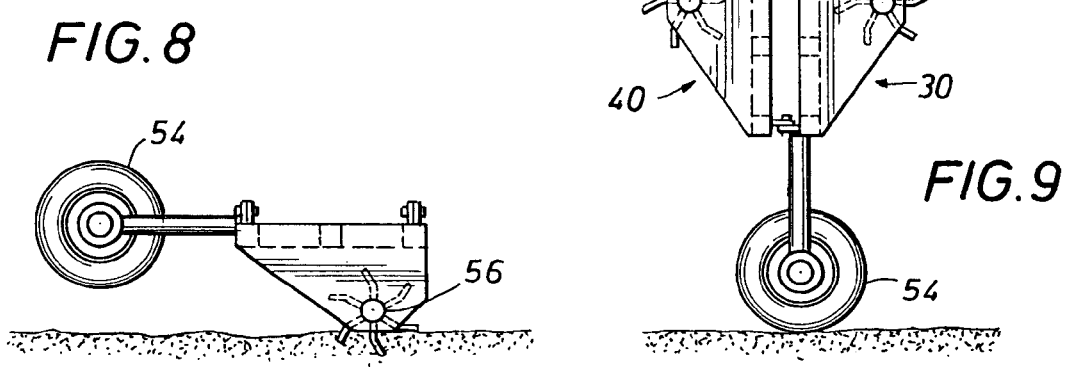
FIG. 8
FIG. 9

SAND FIGHTER

FIELD OF THE INVENTION

The present invention relates generally to the field of farm implements and, more particularly, to a tractor-towed farm implement commonly referred to in the art as a sand fighter.

BACKGROUND OF THE INVENTION

In areas of sandy soil, particularly areas such as West Texas, heavy rain causes the finer and lighter constituents of sand in the soil to striate to top of the soil while heavier, moist soil is left below the surface. Wind will then cause this fine, light sand to blow, injuring crops and losing valuable top soil. To prevent the sand from blowing, an implement called sand fighter has been developed. A sand fighter tills up the heavier, moist soil below the surface onto the lighter components at the top of the soil, alleviating the wind effects.

Sand fighters commonly used today include an articulated frame extending over a distance of up to about 80 feet. One or more shafts is joined to the frame for rotational movement and tines spaced apart along the shafts dig into the soil to till up the heavier soil components. Each of the tines is a bent or straight prong extending radially from the shaft to penetrate the soil about one inch. The sand fighter is light enough to be pulled behind a tractor to treat large areas for farm land relatively quickly.

Known sand fighters are adapted to be towed by a chain or a hitch behind a tractor and the sand fighters remain in a deployed configuration in contact with the soil. Other articulated sand fighters are provided with hinged connections at various points along the frame so that the sand fighter can be folded up and hydraulic means are provided to lift the sand fighter out of contact with the soil so that the sand fighter can be transported to another field for use. Unfortunately, such sand fighters generally still extend over a very wide transverse direction even when folded up and present a difficult problem for the farmer in transporting the sand fighter to a distant field, not to mention the problem with other drivers along the roadway as the sand fighter is being transported over the roadway.

As previously described, some sand fighters are coupled to the power lift of the tractor providing a means to lift the sand fighter out of contact with the soil. Also, some sand fighters are built in sections having end sections which are folded over. Such a sand fighter is easier to turn at the turn rows and to transport from one field to another. However, known sand fighters either do not cover as wide a swath as is desirable, or they present too wide a profile when they are collapsed for transporting between fields.

Further, other known sand fighters include a number of closing spaced tines on the shafts, separated by wider spaces for avoiding young, growing crops. Such sand fighters require skill and great attention to the path and direction of towing the sand fighter, and do not till large areas of the field in the wide spaces between the closely packed tines.

These and other limitations in the art are addressed by the present invention.

SUMMARY OF THE INVENTION

The present invention provides a folding sand fighter adapted to be carried on the power lift of a tractor. The frame of the sand fighter consists of five frame sections with the center frame substantially shorter in length than the other sections of the frame. Each section includes a shaft with a plurality of evenly spaced tines to till up the heavier moist soil below the surface.

The center section includes a hitch adapted to be attached to only two points of a standard three point hitch of the farm tractor. The center section is hydraulically actuated to lift the entire sand fighter up out of the soil. The two sections immediately outboard of the center section are preferably joined to the center section with hydraulically actuated, hinged joints so that these sections are drawn forward alongside the towing frame for transport of the sand fighter. The outermost sections are preferably manually operated, although these sections may also be hydraulically actuated. The outermost sections collapse alongside the intermediate sections to provide a small profile for transport of the sand fighter.

A set of wheels are provided on the towing frame to support the sand fighter. Another set of wheels are provided to support the weight of the outer most and intermediate sections during deployment of the sections of the sand fighter and during the collapsing of the sand fighter for transport.

These and other features and advantages of the invention will be apparent to those skilled in the art from a review of the following detailed description along with the accompanying drawings.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

FIG. 1 is a top view of the sand fighter of this invention shown in a deployed configuration for operation.

FIG. 2 is a top view of the sand fighter with the frame sections extended, but with the sand fighter lifted up out of the soil.

FIG. 6 is a top view of the sand fighter showing the outer most sections folded back against the intermediate sections.

FIG. 7 is a top view of the sand fighter showing the outermost and intermediate sections folded forward alongside the towing frame.

FIG. 8 is a side elevation detail view showing the deployment support wheels during operation of the sand fighter.

FIG. 9 is a side elevation detail view showing the use of the deployment support wheels.

DETAILED DESCRIPTION OF PREFERRED EMBODIMENTS

Figure 3:
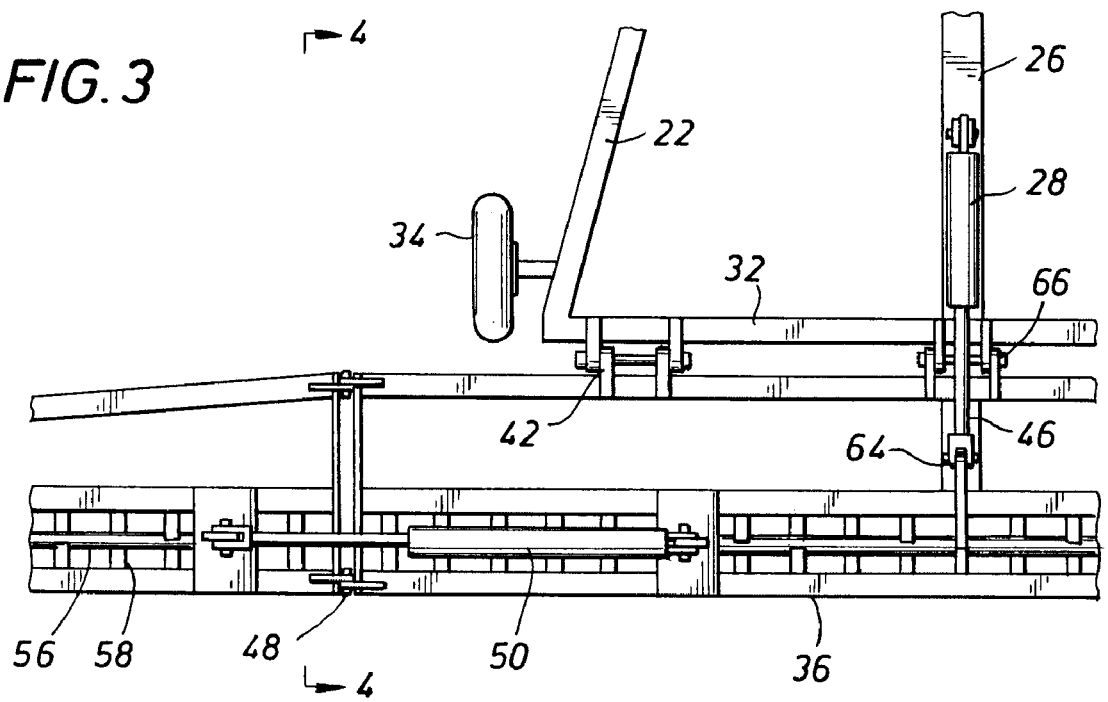
FIG. 3 is a top detail view of the sand fighter showing the section joint connections.

FIG. 1 provides a top view of the overall sand fighter 10 of this invention. The implement comprises a lightweight frame, preferably made of steel or other appropriate material that is easy to form. The frame is primarily is two parts, a towing frame 12 and an articulated towed frame 14. The towing frame 12 is adapted to be coupled to a tractor (not shown) at points 16 and 18, two points of a standard three point towing arrangement at the rear of a tractor. This feature of the present invention substantially improves the turning capability of this sand fighter over known implements. The forward end of the sand fighter thus comprises a transverse coupling bar 20 adapted to coupled to points 16 and 18.

A triangular member 22 is welded or otherwise formed to the coupling bar 20. A support rack 24 is welded or otherwise formed to the triangular member 22 to support the articulated towed frame during transport operations as described below. A fore and aft frame member 26, between the sides of the triangular member 22, provides structural strength and supports a hydraulic cylinder 28. The hydraulic cylinder 28 is used to raise and lower the articulated towed frame 14. Transverse frame members 30 and 32 complete the towing frame 12, providing mechanical robustness without adding a great deal of weight to the structure. The after end of the towing frame 12 is supported on wheels 34.

The towed frame 14 comprises five sections, a center section 36, intermediate sections 38, and end sections 40. The center section 36 is coupled to the towing frame 12 with hinged joints 42. The center section 36 is made as short as possible, extending only a short distance beyond the wheels 34, another feature of the invention. This feature provides the narrowest possible towing width s o that the sand fighter can be more easily transported from one field to another.

The center section 36 includes a frame member 44 to anchor a rod 46 from the hydraulic cylinder 28. Actuation of the hydraulic cylinder 28 thus moves the center section and therefore the entire towed frame 14. This is shown in FIG. 2, and described in more detail below.

The intermediate sections 38 are joined to the center section 36 at hinged joints 48. The joints 48 a re preferably actuated by hydraulic units 50 or other mechanically assisted means due to the weight of the components. The hydraulic units 28 and 50 are preferably powered off the hydraulic power pack of the tractor.

The outermost or end sections 40 are joined to the intermediate sections 38 at hinged joints 52. The intermediate section s 38 and the end sections 40 are substantially longer than the center section 36, to provide a wide swath for the sand fighter when deployed, but maintaining the narrow profile for towing. A pair of deployment wheels 54 a re provided to support the weight of the intermediate and end section s during deployment and retraction of the sections of the sand fighter, but the deployment wheels are rotated up as shown in FIG. 1 when the sand fighter is in use, and they are lifted up out of contact with the ground when the sand fighter is collapsed for transport. The deployment wheels are preferably located at the joints 52.

Each section includes a shaft 56 having a plurality of tines 58 attached thereto. The shafts 56 are supported on each end by a bearing 60 for free rotation. An angle brace 62 is also provided in each section for mechanical strength. Note that the end sections are preferably manually operated, but hydraulic units may also be provided for movement of the joints 52 if desired.

FIG. 2 shows the sand fighter 10 with the hydraulic unit 28 retracted but the sections 38 and 40 fully deployed. The deployment wheels 54, since they are mechanically joined to the towed frame 14, rotate with the frame so that in FIG. 2, the wheels are in contact with the ground. This feature of the invention is shown more clearly in FIGS. 8 and 9, and described below.

FIG. 3 provides additional details of the mechanical couplings between various units of the sand fighter. The hydraulic unit 28 is coupled to the frame member 26 at one end, and to center section 36 at a hinged joint 64. A hinged joint 66 is also provided between the towing frame 12 and the towed frame 14, but was not shown in FIG. 1 for clarity. The joint 66 is provided at the point of compression stress between the frames during retraction operations of the hydraulic unit 28.

Figure 4:
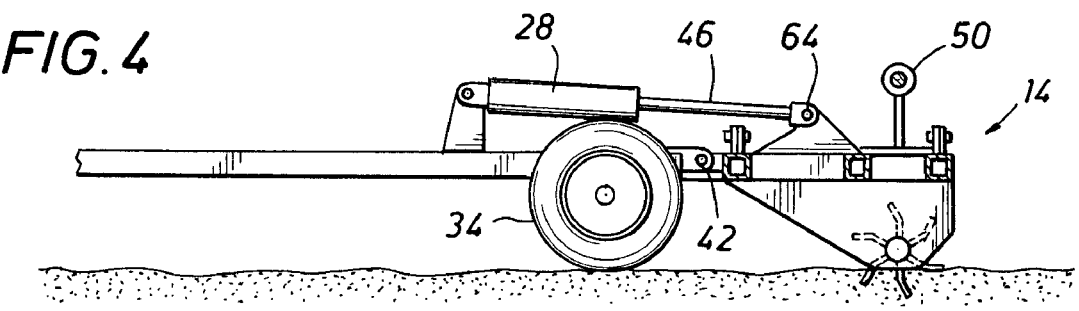
FIG. 4 is a side elevation view showing the sand fighter in a deployed configuration for operation.
Figure 5:
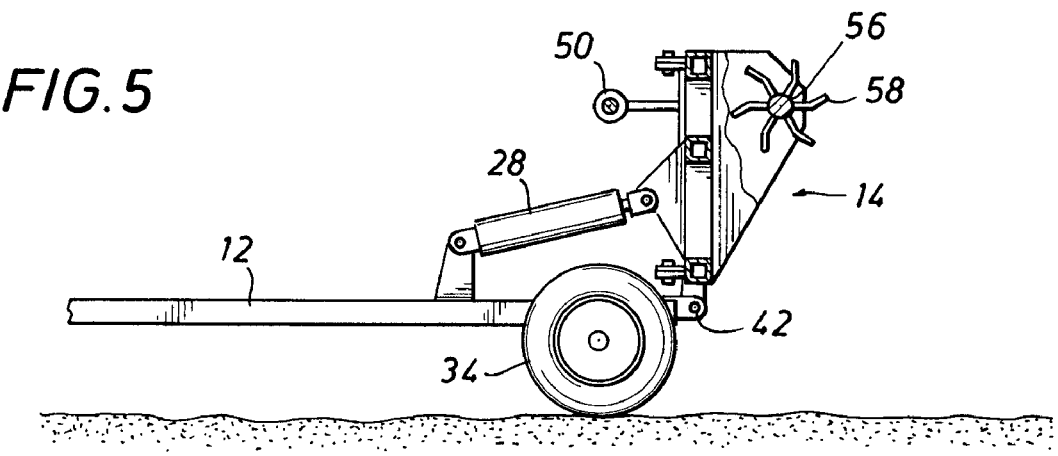
FIG. 5 is a side elevation view showing the sand fighter lifted up out of the soil.

FIGS. 4 and 5 depict side views of the sand fighter, and FIG. 5 is taken along the view lines 5–5 of FIG. 2. FIG. 4 depicts the sand fighter in a deployed position with the towed frame 14 in the down position, that is, the rod 46 is extended from the cylinder 28. The towed frame 14 rotates about the hinge 42 until the tines 58 are placed in an operative position to till into the earth approximately one inch. When the sand fighter is to be lifted from contact with the ground, the rod 46 is retracted into the cylinder 28, as shown in FIG. 5. The towed frame 14 rotates about the hinged connection 42, and the frame is roughly in a vertical position.

The process of retracting the sand fighter then continues as depicted in FIG. 6. Once the towed frame 14 is lifted up, then the end sections 40 are free to easily swing forward (i.e., toward the forward end of the towing frame and the tractor) until the end sections are parallel with the intermediate sections 38. It should be understood that the deployment wheels 54 are now supporting the weight at the outer ends of the intermediate sections 38, but are not shown in FIGS. 6 and 7 for clarity. The process then continues with FIG. 7 where the cylinder units 50 are retracted, and the sections 38 and 40 rotate about the hinges 48. The hinges 52 are then lifted onto the support rack 24 and secured for transport of the sand fighter.

Finally, FIGS. 8 and 9 illustrate the operation of the deployment wheels 54. FIG. 8 is a view taken along the view lines 8—8 of FIG. 1. When the sand fighter is deployed for operation, the deployment wheels are rotated forward, up off the ground, as shown in FIG. 8. FIG. 9 is a view taken along the view lines 9—9 of FIG. 6. When the cylinder 28 is retracted, the deployment wheels 54 contact the ground, thereby lifting up the sections 38 and 40 to support their weight. The sections 38 and 40 can then be easily swung forward into the fully collapsed position shown in FIG. 7 for transport of the sand fighter.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A sand fighter comprising:
   a. a towing frame adapted to be coupled to two towing connections of a tractor, the towing frame supported on a pair of towing wheels which are spaced apart a first distance, the towing frame defining a plane;
   b. a towed frame hingedly connected to the towing frame, the towed frame comprising:
      i. a short center section that is longer than the first distance;
      ii. a pair of intermediate sections hingedly connected to the center section, the intermediate sections substantially longer than the center section; and
      iii. a pair of end sections hingedly connected to the intermediate sections, the end sections substantially longer than the center section;
   c. each of the sections comprising a support frame, a rotatable shaft retained on the support frame, and a plurality of tines extending radially outwardly from the shaft;

d. wherein the towed frame defines a deployed condition, wherein the center, intermediate, and end sections extend end-to-end, and a raised condition, wherein the center, intermediate, and end sections are folded together substantially in the plane of the towing frame.

2. The sand fighter of claim 1, further comprising a hydraulic actuator at the hinged connection between the towing frame and the towed frame.

3. The sand fighter of claim 1, further comprising a deployment support wheel at each hinged connection between the end section and its associated intermediate section.

4. The sand fighter of claim 1, further comprising a hydraulic actuator at the hinged connection between the center section and each intermediate section.

5. The sand fighter of claim 1, further comprising a support rack to retain the intermediate and end sections for transport of the sand fighter.

6. The sand fighter of claim 1, wherein the tines are spaced apart at substantially equal intervals along the shaft.

7. A method of collapsing a sand fighter to a configuration for transport, comprising the steps of:
   a. rotating an articulated towed frame about a hinged connection to a towing frame;
   b. supporting the articulated towed frame on a pair of support wheels;
   c. collapsing a pair of end sections into a parallel relationship with a pair of associated intermediate sections;
   d. hydraulically collapsing the end and intermediate sections to a position alongside the towing frame;
   e. supporting the end and intermediate sections on a support rack for transporting the sand fighter; and
   f. wherein the towed frame defines a deployed condition, wherein the center, intermediate, and end sections extend end-to-end, and a raised condition, wherein the center, intermediate, and end sections are folded together substantially in the plane of the towing frame.

8. A farm implement adapted to till heavy moist soil onto light dry soil underneath the moist soil, the implement comprising:
   a. an A-frame shaped towing frame, the towing frame having a transverse towing bar adapted to couple to two points of a standard three point towing system of a tractor;
   b. a support rack on the towing frame;
   c. a pair of spaced apart wheels on the towing frame;
   d. a towed frame connected to the towing frame with a first hydraulically actuated hinge connection, the towed frame comprising:
      i. a center section to which the towed frame is connected to the towing frame with the first hydraulically actuated hinge connection;
      ii. a pair of intermediate sections connected to the center section with second hydraulically actuated hinge connections;
      iii. a pair of end sections hingedly connected to the intermediate sections at a manually operated hinge connection; and
      iv. a deployment support wheel adjacent each hinge connection between intermediate and end sections;
   e. each of the sections comprising a support frame, a rotatable shaft retained on the support frame, and a plurality of tines extending radially outwardly from the shaft; and
   f. wherein the towed frame defines a deployed condition, wherein the center, intermediate, and end sections extend end-to-end, and a raised condition, wherein the center, intermediate, and end sections are folded together substantially in the plane of the towing frame.

* * * * *